United States Patent
Núñez et al.

(10) Patent No.: US 6,903,138 B2
(45) Date of Patent: *Jun. 7, 2005

(54) MANUFACTURE OF STABLE BIMODAL EMULSIONS USING DYNAMIC MIXING

(75) Inventors: Gustavo A Núñez, El Hatillo (VE); Clara E Mata, San Antonio de los Altos (VE); Carolina Blanco, La Laqurila (VE); Manuel Segundo Chirinos, Los Teques (VE); Gerardo Alonso Sánchez, Los Teques (VE); Tulio Rafael Colmenares, Caracas (VE); Hercilio Jose Rivas, Caracas (VE); Felix Abraham Silva, San Antonio de los Altos (VE)

(73) Assignee: Intevep, S.A., Caracas (VE)

( * ) Notice: Subject to any disclaimer, the term of this patent is extended or adjusted under 35 U.S.C. 154(b) by 0 days.

This patent is subject to a terminal disclaimer.

(21) Appl. No.: 10/162,105

(22) Filed: Jun. 3, 2002

(65) Prior Publication Data

US 2003/0225167 A1 Dec. 4, 2003

(51) Int. Cl.[7] .................................................. B01F 3/08
(52) U.S. Cl. ........................... 516/53; 516/76; 516/924; 44/301; 366/336; 366/175.2; 366/181.5
(58) Field of Search ........................... 516/53, 76, 924; 44/301; 366/336, 175.2, 181.5

(56) References Cited

U.S. PATENT DOCUMENTS

| | | | |
|---|---|---|---|
| 4,832,747 A | * 5/1989 | Marchal | 516/928 |
| 5,000,872 A | * 3/1991 | Olah | 516/924 |
| 5,236,624 A | * 8/1993 | Lepert et al. | 516/928 |
| 5,399,293 A | 3/1995 | Nunez et al. | 516/76 |
| 5,480,583 A | * 1/1996 | Rivas et al. | 516/73 |
| 5,503,772 A | * 4/1996 | Rivas et al. | 516/53 |
| 5,505,876 A | * 4/1996 | Rivas et al. | 516/76 |
| 5,622,920 A | * 4/1997 | Rivas et al. | 516/923 |
| 6,677,387 B2 | * 1/2004 | Gurfinkel Castillo et al. | 516/53 |
| 2003/0223307 A1 | * 12/2003 | Nunez et al. | 366/181.5 |

* cited by examiner

Primary Examiner—Daniel S. Metzmaier
(74) Attorney, Agent, or Firm—Bachman & LaPointe, P.C.

(57) ABSTRACT

A process for preparing a bimodal emulsion of viscous hydrocarbon in water includes providing a stream of water at ambient temperature; providing a liquid additive that tends to gel when mixed with water at temperatures less than a gelling temperature $T_G$; heating the stream to provide a heated stream at a temperature $T_C$ which is greater than ambient temperature and less than the gelling temperature $T_G$; feeding the heated stream to a mixer having a mixer inlet so as to impart energy to the heated stream; adding the liquid additive to the heated stream downstream of the mixer inlet, whereby the liquid additive mixes with the stream and the energy inhibits gelling of the liquid additive to provide a substantially homogeneous solution of additive in water. The solution is then divided and used to make two different droplet sized emulsions which are mixed to form the bimodal emulsion.

7 Claims, 7 Drawing Sheets

US 6,903,138 B2

MANUFACTURE OF STABLE BIMODAL EMULSIONS USING DYNAMIC MIXING

BACKGROUND OF THE INVENTION

The invention relates to the preparation of bimodal emulsions and, more particularly, to a process for preparing such emulsions wherein gelling of additives such as surfactants is avoided.

Viscous hydrocarbons such as natural bitumen are found in significant amounts in Canada, the United States, China, Nigeria and Venezuela. These bitumens typically are a liquid having viscosities from 1,000 to 600,000 cP at room temperature. This viscosity, and the relative low reactivity of such materials, make for substantial difficulties in handling. One method for addressing such problems is to make an emulsion in water of such materials thereby reducing viscosity of same.

Different methods have been proposed for preparing such emulsions, and these emulsions must be stabilized using emulsifiers or surfactants which can be added and/or activated from within the hydrocarbon. Additives to form stable emulsions however, typically experience difficulty because they are provided in concentrated form, and tend to gel when diluted with water to the relatively small amounts desired.

It is the primary object of the present invention to provide a process for preparing a bimodal emulsion of viscous hydrocarbon in water which avoids these and other problems.

It is a further object of the present invention to provide such a process which produces a stable and useful end product.

Other objects and advantages of the present invention will appear hereinbelow.

BRIEF DESCRIPTION OF THE DRAWINGS

A detailed description of preferred embodiments of the present invention follows, with reference to the attached drawings, wherein.

DETAILED DESCRIPTION

The invention relates to a process for preparing bimodal emulsions including the preparation of solutions of additives and surfactants wherein heating and a static mixer are used to avoid gelling of the additives.

Surfactant additives used to form the bimodal bitumen-in-water emulsion in accordance with the invention are prepared as discussed below so as to avoid gelling of the surfactant when diluted with the water phase of the emulsion.

Figure 1:
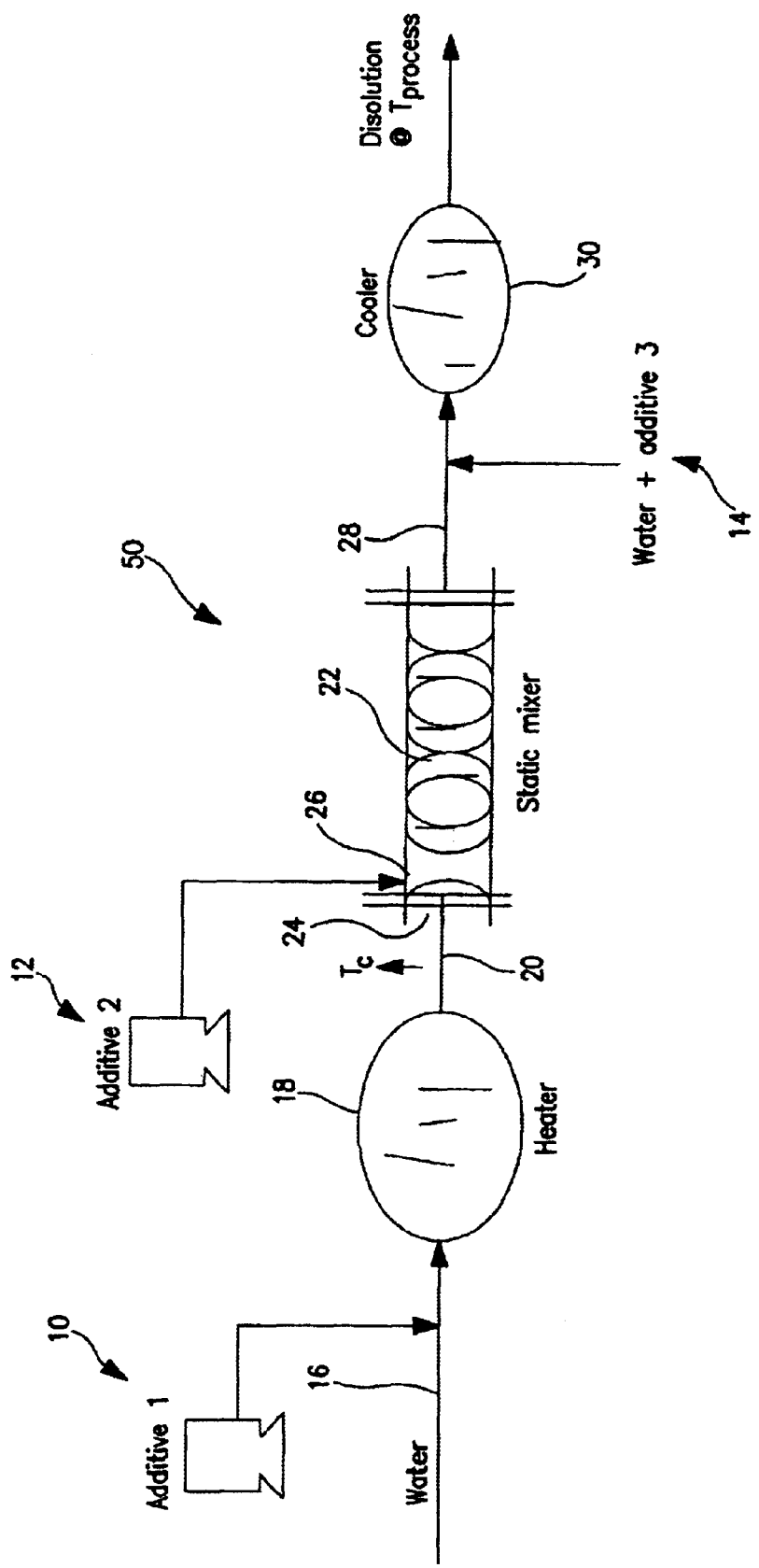
FIG. 1 schematically illustrates a process in accordance with the present invention.

FIG. 1 schematically illustrates a process wherein several additives 10, 12, 14 are to be added to a stream 16 of water. In accordance with this embodiment of the present invention, additives 10 and 14 are water soluble, and do not gel, and can therefore be added at any convenient point.

Additive 12, however, is an additive which tends to gel if mixed with water at ambient temperature. Stream 16 is therefore fed to a heater 18 to increase the temperature of stream 16 from ambient temperature to a temperature $T_C$ which is greater than ambient temperature, and which is preferably less than the highest gelling temperature $T_G$ of additive 12. The heated stream 20 is then fed to a static mixer 22, through a static mixer inlet 24, to impart energy to the stream. Once at least some energy has been imparted to the stream, additive 12 is then added to static mixer, preferably at an additive inlet 26 which is schematically illustrated in FIG. 1.

The energy imparted to stream 20 within mixer 22 has advantageously been found to be sufficient to prevent gel formation of additive 12, despite the fact that the temperature of stream 20 has not been heated to a temperature above the gelling temperature $T_G$.

Stream 28 exiting static mixer 22 advantageously comprises a substantially homogeneous and gel-free mixture of water 16 and additive 12, along with any other additives 10 and the like which may have been provided as desired.

As set forth above, additives 10 and 14 are water soluble, and can be added at any point. Thus, in the embodiment illustrated in FIG. 1, additive 10 is added to stream 16 upstream of heater 18 and static mixer 22, while additive 14 is added downstream of mixer 22.

Still referring to FIG. 1, stream 28 can itself be fed, at temperature $T_C$, to further processing steps such as an emulsion forming step or the like, particularly when such process is effective at temperature $T_C$. This is advantageous since the heat used to form the solution can be used again in such emulsion preparation, thereby enhancing process efficiency.

For other processes, wherein lower temperatures are required, stream 28 can be fed to a cooler 30 as schematically illustrated so as to reduce the temperature to a temperature $T_P$ which is more suitable to the desired process.

Figure 2:
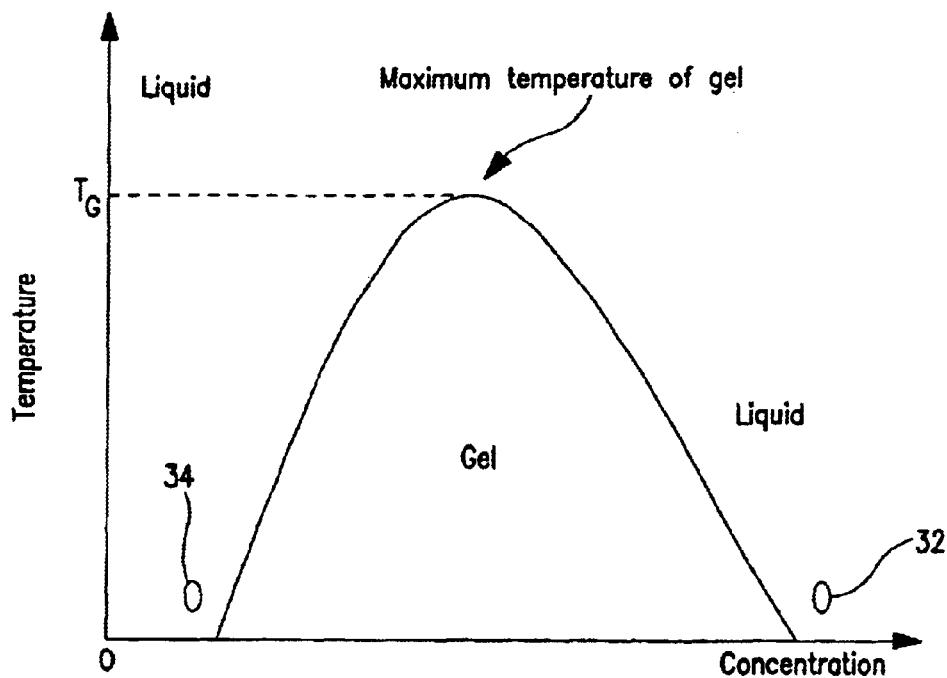
FIG. 2 illustrates the gel temperature profile for a typical surfactant material at different concentrations in water.
Figure 3:
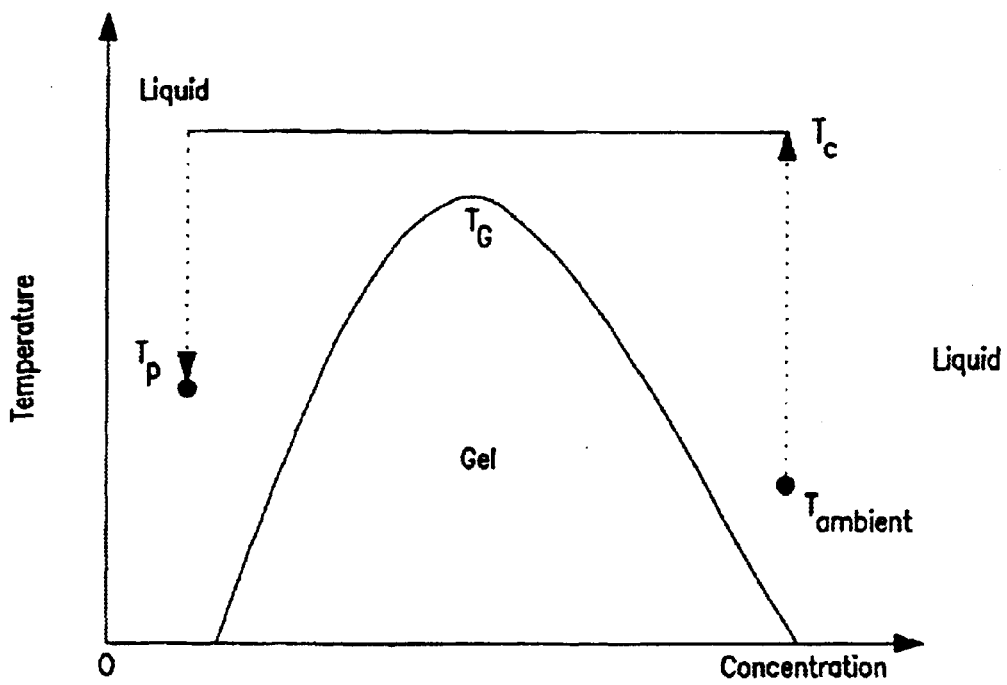
FIG. 3 illustrates a heat-only process that can be used to avoid gelling.
Figure 4:
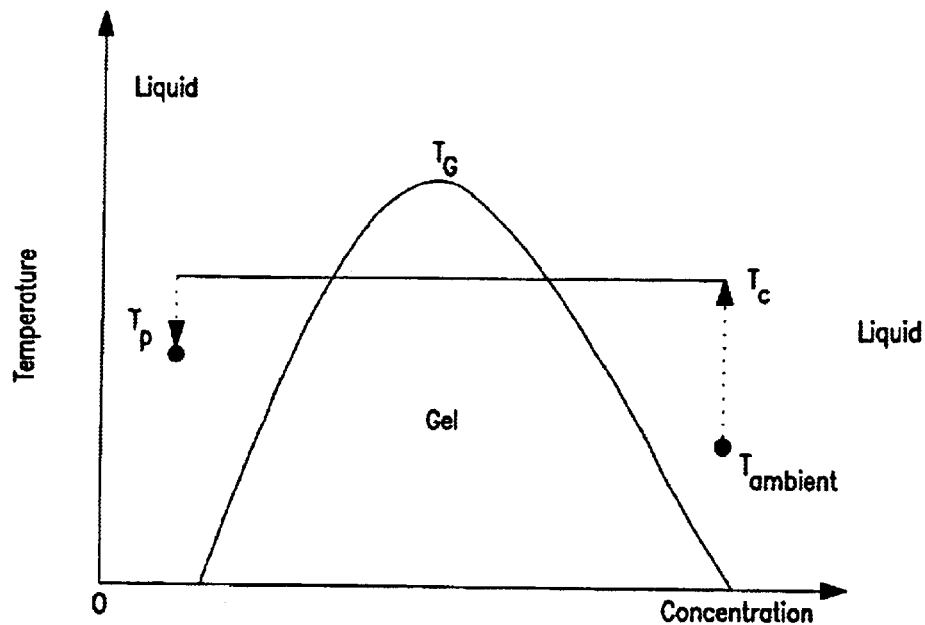
FIG. 4 illustrates a preferred embodiment of the present invention wherein some heat is applied, and mixing energy is used to avoid gel formation.

Referring to FIGS. 2–4, FIG. 2 shows a typical gel temperature profile for a liquid additive having gelling tendencies, and shows the gelling temperature $T_G$ at concentrations of the additive in water. As shown, at high concentrations the additive is liquid at substantially any temperature. As should also be clear, however, if such material is merely added to water, so as to reduce concentration at a low temperature, the additive will certainly gel and cause various problems.

One class of additives which has a gelling profile as illustrated in FIG. 2 are surfactants for use in making oil/water emulsions. For example, non-ionic surfactant such as ethoxylated nonylphenol (NPE) has a profile as illustrated. NPE is typically provided commercially having a concentration in water of at least about 80%, more typically 90% or higher, which generally corresponds to point 32 shown in FIG. 2. It is typical to use such surfactant at a concentration of less than about 1.0%, preferably about 0.2%, which corresponds to point 34 shown on FIG. 2. In accordance with the present invention, the process provided allows for dilution from point 32 to point 34 without the need to heat in excess of temperature $T_G$, and without the formation of gel.

FIG. 3 illustrates the heating and cooling that would be necessary to go from ambient temperature to a processing temperature ($T_P$) while heating to a temperature above $T_G$. While this would avoid formation of gel, it should readily be appreciated that the heating and cooling costs would be substantial.

Turning now to FIG. 4, the preferred process of the present invention is shown wherein the additive is diluted with water that is heated to a temperature $T_C$ that is greater than ambient temperature, but less than the highest gel formation temperature $T_G$. This moves the additive sufficiently high on the gel formation profile that energy imparted from the static mixer can successfully prevent formation of gel and allow effective mixture with the liquid base or water as desired.

It should readily be appreciated that the heating and cooling costs in the process of the present invention are substantially reduced as compared to that in FIG. 3. Further, a static mixer which is used to provide the energy desired is likewise efficiently operated, reliable and inexpensive.

Figure 5:
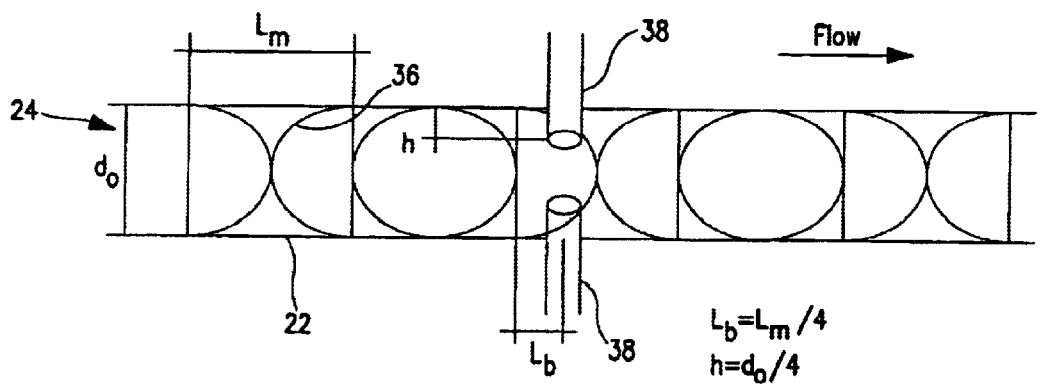
FIG. 5 schematically illustrates a preferred mixing in accordance with the present invention, along with preferred placement of an injector for additives.

Turning now to FIG. 5, a preferred placement of additive inlet is illustrated. FIG. 5 schematically shows a static mixer wherein mixer 22 has a series of swirling flow imparting elements 36 each having a length $L_m$ corresponding to a 90° rotation along mixer 22. Mixer 22 and elements 36 also have a diameter $d_o$. In accordance with the present invention, a surfactant or additive inlet 38, or preferably a plurality of inlets 38, are advantageously positioned downstream of the beginning of the third swirling flow imparting element 36 by a distance $L_b$ which is preferably approximately equal to $L_m/4$. Furthermore, inlet or inlets 38 advantageously extend inwardly into mixer 22 by a distance h which is preferably equal to about $d_o/4$. This advantageously injects the additive into the stream at a point where sufficient swirling energy has been imparted that gel formation can be avoided at temperatures less than the gel formation temperature. This advantageously provides for the excellent results obtained in accordance with the present invention.

It should readily be appreciated that the solution preparation process provided can be carried out in a continuous manner, and provides for manufacture of downstream products such as viscous hydrocarbon in water emulsions with a high degree of quality since surfactant concentration is homogeneously distributed through the water phase. Furthermore, it should readily be appreciated that this process provides such excellent results with a minimum amount of energy used for heating and/or cooling, and utilizing a mixer which requires a minimum amount of maintenance.

Figure 6:
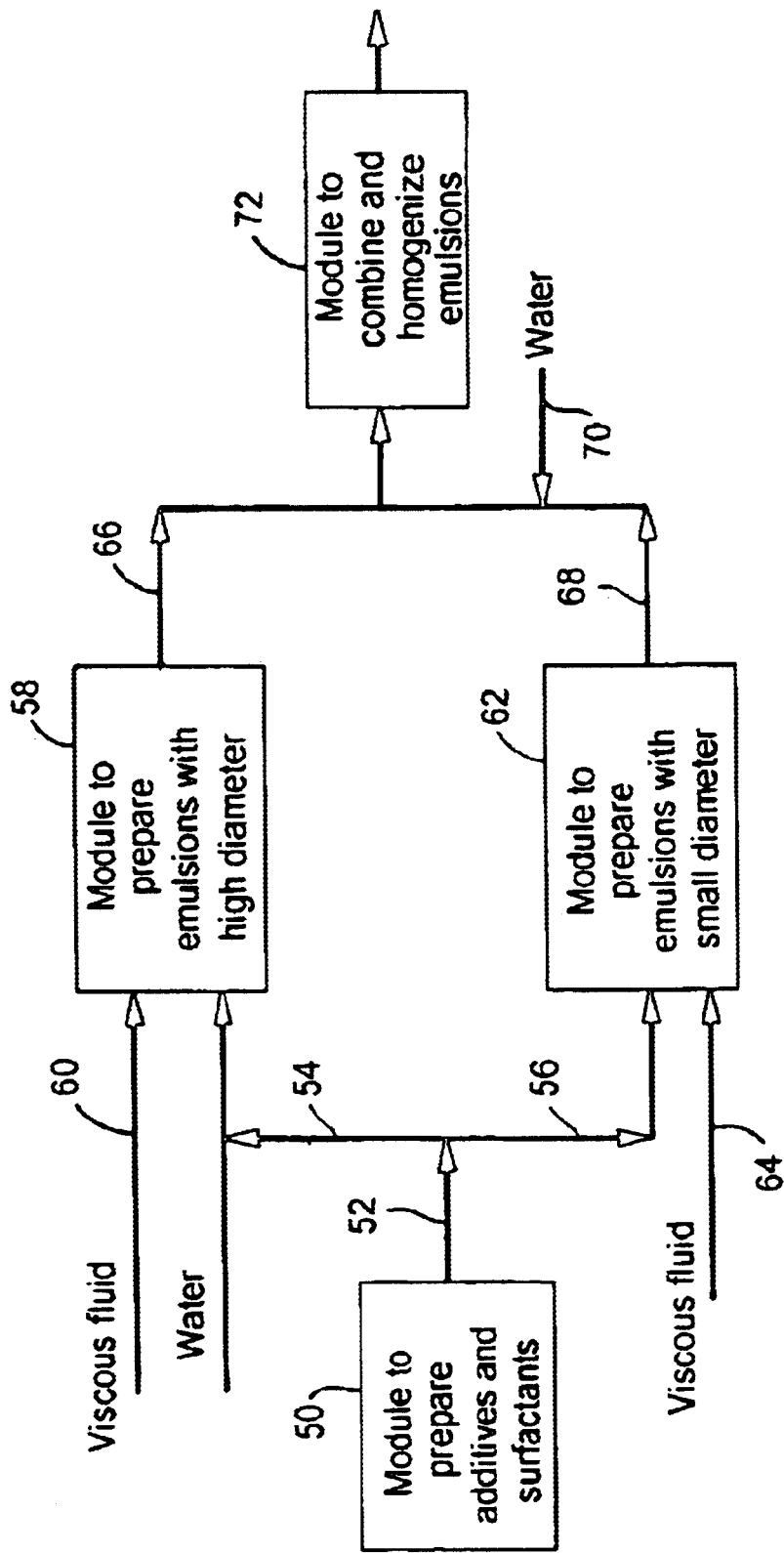
FIG. 6 schematically illustrates an integrated process for preparing a bimodal emulsion of viscous hydrocarbon in water.

Turning now to FIG. 6, a schematic illustration of the overall process of the present invention is provided. In FIG. 6, a first module or process 50 is shown which corresponds to the process for preparation of the additive solution as discussed above in FIGS. 1–5.

As shown, a resulting stream 52, which is advantageously a substantially homogeneous mixture of the water and desired additives, is divided into a first portion 54 and a second portion 56. First portion 54 is then fed to a module 58 for preparation of a large droplet diameter emulsion with a viscous hydrocarbon 60, while second portion 56 is fed to a module 62 for preparation of a small droplet diameter emulsion with a viscous hydrocarbon 64. The resulting emulsions 66, 68, are then advantageously combined, with additional water 70 as desired, in a module 72 so as to provide the final bimodal emulsion.

Figure 7:
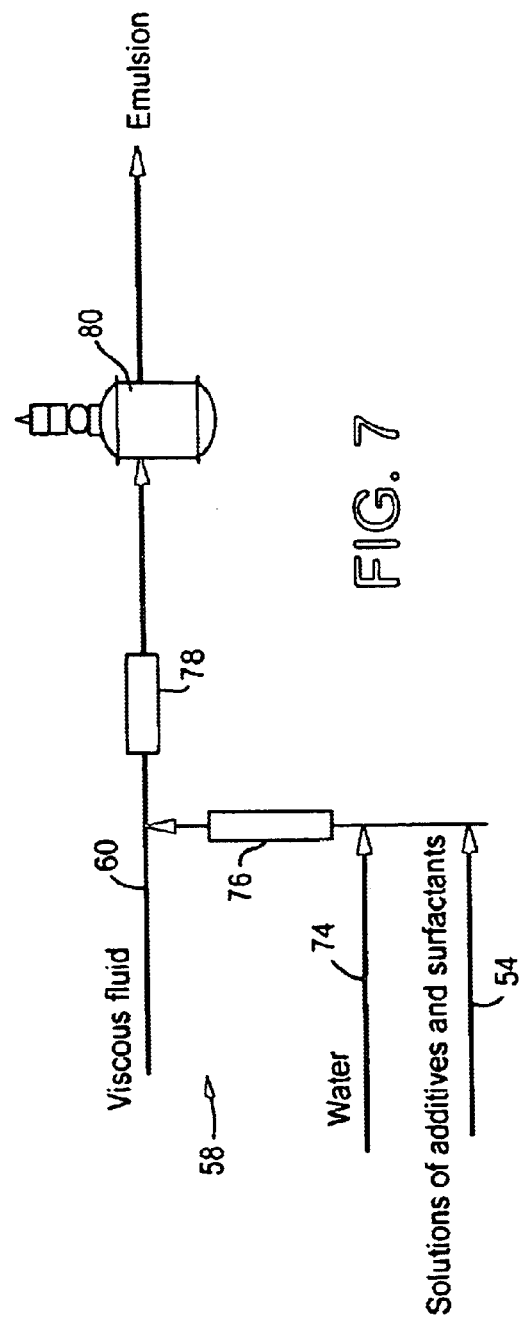
FIG. 7 further illustrates a portion of the process of FIG. 1 for formation of large diameter droplets.

Turning to FIG. 7, module 58 of FIG. 6 for preparation of the large diameter emulsion is further illustrated. As shown, solution stream 54 may be mixed with additional water 74 and fed through a coarse mixer 76 before injecting into a stream of viscous hydrocarbon 60. This mixture is then fed through a coarse mixer 78 if desired, and then to a dynamic mixer 80 which is operated at a shear rate sufficient to produce the desire emulsion having a droplet size, in this instance preferably greater than or equal to about 20 microns. This emulsion may advantageously be formed having a ratio of hydrocarbon to water of between about 80:20 and about 85:15.

Figure 8:
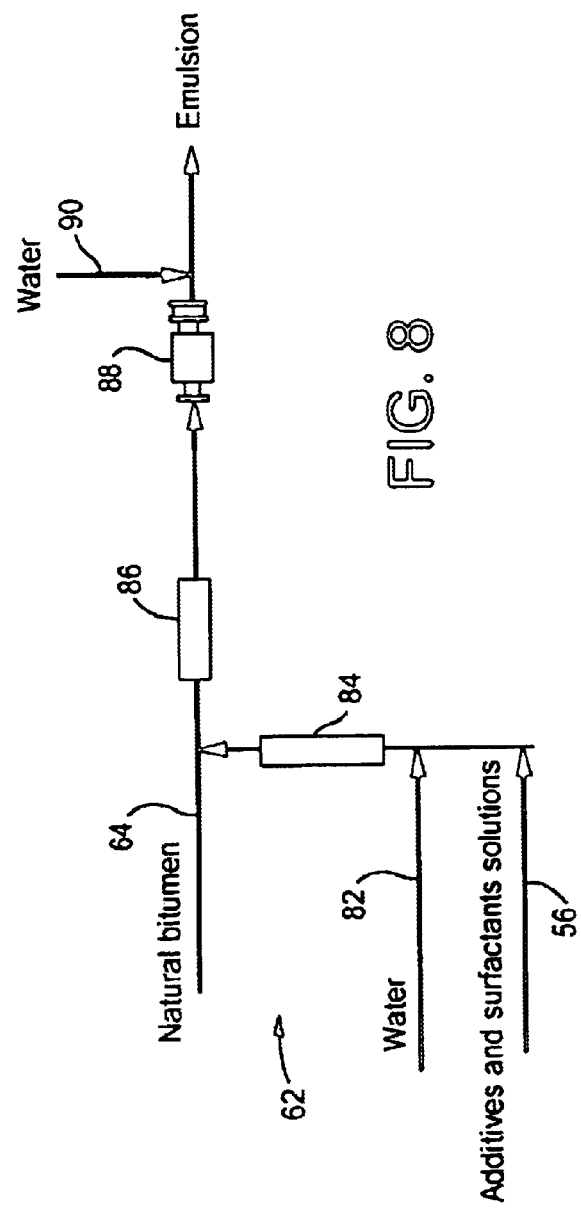
FIG. 8 illustrates a further portion of the process of FIG. 1 for formation of small diameter droplets.

FIG. 8 schematically illustrates module 62 of FIG. 6 for preparation of the small-diameter size emulsion, and shows second portion 56 of the additive solution being mixed with additional water 82 and fed through a coarse mixer 84 before being mixed or injected into a stream of viscous hydrocarbon 64. This mixture is then fed to a coarse mixer 86 and then to a dynamic mixer 88 which is operated at a shear sufficient to form an emulsion having the desired small droplet size, preferably less than or equal to about three microns. This emulsion is preferably formed having a ratio of hydrocarbon to water of about 90:10. Following dynamic mixer 88 the small diameter droplet size emulsion so formed can be mixed with or diluted with additional water 90, and then fed to module 72 as desired.

Figure 9:
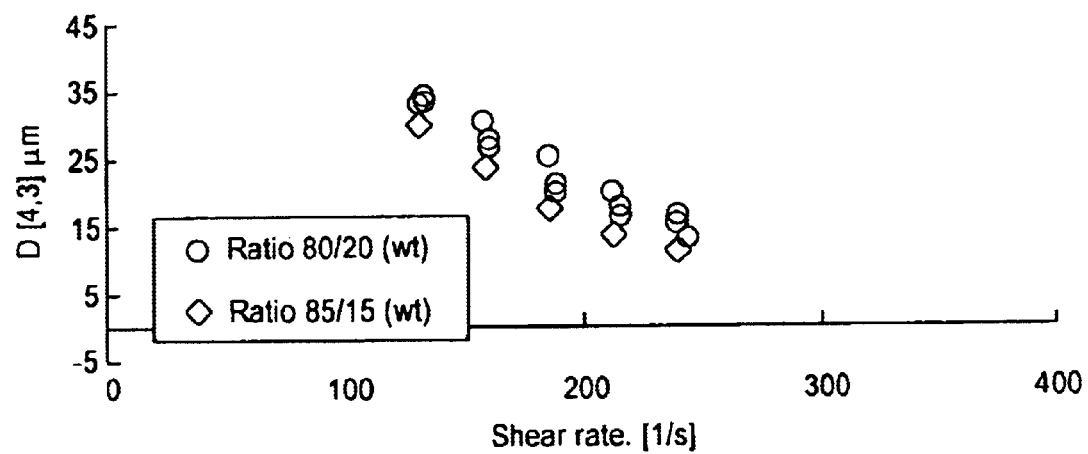
FIG. 9 illustrates the relationship between shear rate and average droplet size for formation of the large droplet size portion of the bimodal emulsion of the present invention.
Figure 10:
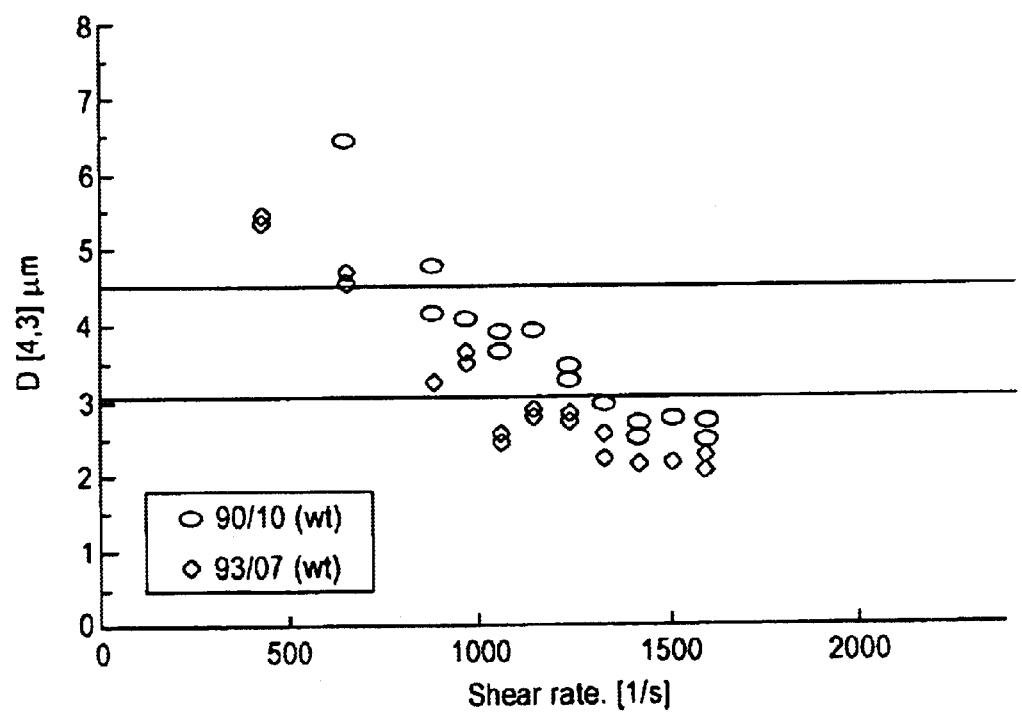
FIG. 10 illustrates the relationship between average droplet size and shear rate for formation of the small-size portion of the bimodal emulsion of the present invention.

FIGS. 9 and 10 show shear rate sufficient for forming the desired emulsion droplet size for the large and small droplet size emulsions in accordance with the present invention.

As shown in FIG. 9, to obtain a droplet size in the range of 20 microns, shear rates are preferably used between about 100 and about 300 1/s.

As shown in FIG. 10, using a dynamic mixer to provide droplet sizes of less than about three microns, shear rates should be used in excess of about 1000 1/s.

In module 72 for combining the two droplet-size emulsions, a further coarse, static or dynamic mixer may be provided for mixing the large droplet size emulsion 66 with the small droplet size emulsion 68 and additional water 70 so as to provide the final bimodal emulsion as desired. In this regard, additional water 70 is preferably added so as to provide a final water content in the emulsion of at least about 29 percent volume.

Hydrocarbons from which emulsions may advantageously be prepared in accordance with the present invention include crude oils, viscous hydrocarbons, refinery resids, natural bitumens and mixtures thereof. As set forth above, the process is particularly useful in connection with bitumens. A particularly preferred viscous hydrocarbon for use in accordance with the present invention, and also as used in the following examples, has properties as set forth below in Table 1.

TABLE 1

| | |
|---|---|
| Carbon | 70–85% by weight |
| Hydrogen | 8.0–11% by weight |
| Sulfur | 2.0–4.5% by weight |
| Nitrogen | 0.3–1.0% by weight |
| Ash | 0.05–0.5% by weight |
| Oxygen | 0.2–1.5% by weight |
| Vanadium | 50–1000 mg/k |
| Nickel | 10–500 mg/k |
| Sodium | 2–100 mg/k |
| Iron | 2–60 mg/k |
| API gravity | 5–11° API |
| Total acid number | 14 1.5–4.0 mg KOH/g |
| Viscosity at 74° F. | 85,000–160,000 cst |
| Net caloric value | 14,000–20,000 Btu/pd |
| Asphaltenes | 8–15% by weight |

The additives to be added to the water phase in the first module may advantageously be commercial non-ionic or anionic surfactants, pH buffering additives, non-active surfactants which may exist in the organic phase, and combinations thereof.

The following examples demonstrates the excellent results obtained using the solution preparation process of the present invention.

EXAMPLE 1

In this example, a Kenics™ mixer having ¾ inch×12 elements was used to mix ethoxylated nonylphenol (NPE) with water at a temperature of 35° C. This water had been heated to 35° C. from ambient temperature. Mixing was carried out at various water flow rates and additive flow rates, with mixing energy imparted by the static mixer being determined based upon the materials fed to the mixer, the process temperature and specifics of the mixer. Table 2 below sets forth the amounts of dissolution obtained in each case.

TABLE 2

| Water Flow (l/s) | Additive Flow (ml/min.) | Mixing Energy (W/Kg) | Dissolution Degree (grs dissolved/total grs) |
|---|---|---|---|
| 0.42 | 303 | 199 | 0.99 |
| 0.33 | 240 | 104 | 0.98 |
| 0.24 | 180 | 40 | 0.94 |
| 0.12 | 84 | 4 | 0.78 |

As shown, excellent dissolution was obtained at mixing energy of 40 W/Kg and above for the flows shown. At a mixing energy of only 4 W/Kg only 78% dissolution was obtained. Thus, the mixing energy provided by the static mixer in accordance with the present invention clearly helps to avoid gel formation and enhances complete dissolution of the additive.

EXAMPLE 2

In this example, a stream of heated water was mixed with surfactant in three different locations along the mixer in order to demonstrate the advantageous position of injectors for the additive.

In the first instance, the additive was injected at the entrance to the mixer, along with the water. In the second evaluation, the additive was injected through a single injector at a point as selected according to the illustration of FIG. 5. Finally, in a third evaluation, additive was injected through two injectors positioned at a point as illustrated in FIG. 5.

With the additive introduced at the entrance to the mixer, only 72% dissolution was obtained. With additive introduced through a single injector downstream of the inlet, 80% dissolution was obtained. With the additive injected through two injectors downstream of the inlet as illustrated in FIG. 5, 94% dissolution was obtained. Thus, positioning of the injector or inlet for the additive in accordance with the present invention provides for enhanced dissolution as desired.

It should be appreciated that, in accordance with the present invention, a process has been provided for making a stable bimodal bitumen-in-water emulsion wherein gelling of surfactants is avoided as desired.

EXAMPLE 3

This example shows the preparation of a stable monomodal emulsion, having large mean droplet size, of natural bitumen in an aqueous solution of a commercial nonionic surfactant and pH buffer according to the process illustrated in FIG. 6. An aqueous solution containing 1,850 mg/k (by bitumen) of the commercial nonionic surfactant tridecyl ethoxylated alcohol having an HLB number around 15, and also 1,850 mg/k (by bitumen) of monoethanolamine in water at 65° C., were used. The pH of the monoethanolamine solution was 10.56. To promote an effective dissolution of the surfactant and monoethanolamine as well as a good homogenization of both additives, a Kenics™ static mixer was used. The viscous hydrocarbon or natural bitumen having the characteristics described in Table 1 was heated to 80° C. The mixture rate of bitumen to aqueous solution of surfactant and pH buffer was established at 85:15. For their initial contact a static mixer with a low number of elements was selected. The preparation of the emulsion was done in a dynamic mixer similar to the one claimed in the U.S. Pat. No. 5,399,293. In this case for a mean shear rate of 190 s$^{-1}$ using an Orimixer type dynamic mixing device, emulsions with a mean droplet size of 20 microns can be obtained as shown in FIG. 7. The resulting monomodal emulsions had a distribution associated to mean droplet size very similar to the one shown in FIG. 7.

EXAMPLE 4

This example shows the preparation of a stable monomodal emulsion having a small mean droplet size, of a natural bitumen in an aqueous solution of a commercial nonionic surfactant and pH buffer additive following the process illustrated in FIG. 1. An aqueous solution of 1,850 mg/k (by bitumen) of a tridecyl ethoxylated alcohol whose HLB number is approximately 15 was used. This solution contained also 1,850 mg/k of monoethanolamine and its pH was 10.56. The solution was heated to 65° C. for the effective dissolution of the surfactant and homogenization of the monoethanolamine added. A Kenics™ in line or static mixer having an adequate number of elements was used for mixing of the emulsion components. The viscous hydrocarbon or natural bitumen having the characteristics stated in Table 1 was heated to 80° C. The rate for mixture of bitumen and aqueous solution of surfactant and pH buffer was established at 90:10. For their initial contact a static mixer with a low number of elements was selected. The preparation of the emulsion was done separately in a dynamic mixer having flat mixer blades. In this case a mean shear rate of 1,200 s$^{-1}$ was obtained and emulsions with mean droplet sizes of 3 microns can be produced as shown in FIG. 8. The resulting monomodal emulsions had a distribution associated to their mean droplet size very similar to that shown in FIG. 8.

EXAMPLE 5

Figure 11:
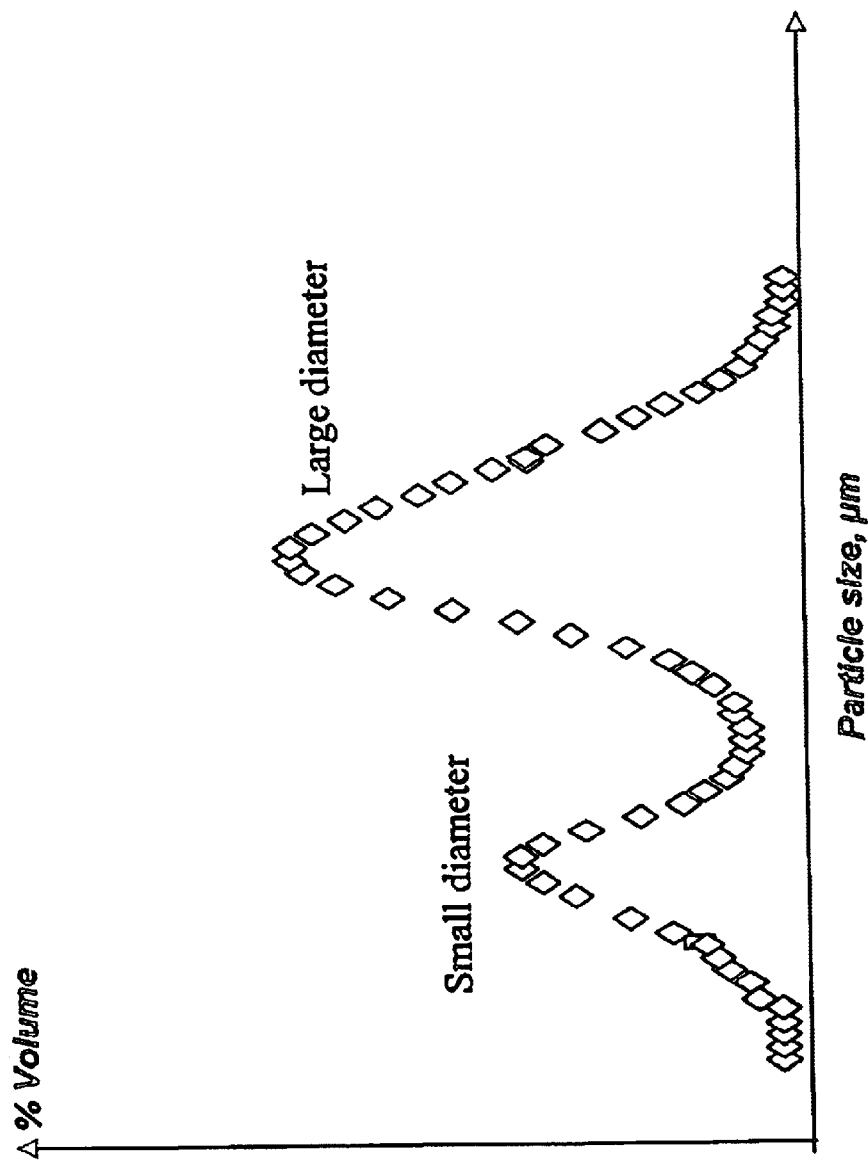
FIG. 11 illustrates droplet size distribution for bimodal emulsion produced according to the invention.

This example shows the preparation of a stable bimodal emulsion of a natural bitumen in an aqueous solution of commercial nonionic surfactant and pH buffer additive according to the method of the present invention. Two emulsions of large and small mean droplet sizes were made as shown in FIG. 6. In this particular case, two emulsifying modules where used. One module produced an emulsion with a mean droplet size of 20 microns. The other emulsifying module produced an emulsion having a mean droplet size of 3 microns. Both emulsions were subsequently mixed at a rate of large droplet emulsion to small droplet emulsion of 80:20 in a volume rate, to obtain a bimodal emulsion. Thereafter the bimodal emulsion was diluted with water at a natural bitumen to water rate equivalent to 70:30. To homogenize and dilute the bimodal emulsion, a Sulzer™ static mixer provided with 6 mixing elements was used. The distribution related to the mean droplet size of the resulting emulsion is shown in FIG. 11. The large and small diameter droplet emulsions preparation was made following the procedures described in Examples 3 and 4, respectively. In practical cases they should be produced in amounts sufficient to fulfill proportions from 60:40 to 40:60, on a large diameter emulsion:small diameter emulsion rate basis, depending on the properties and requirements of the final emulsion.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for preparing a bimodal emulsion of viscous hydrocarbon in water comprising the steps of:

providing a stream of water at ambient temperature;

providing at least one liquid additive that tends to gel when mixed with water at temperatures less than a maximum gelling temperature $T_G$ of said liquid additive;

heating said stream to provide a heated stream at a temperature $T_C$ which is greater than ambient temperature and less than said maximum gelling temperature $T_G$;

feeding said heated stream to a static mixer having a mixer inlet so as to impart energy to said heated stream;

adding said liquid additive to said static mixer downstream of said mixer inlet, whereby said liquid additive mixes with said stream and said energy is at an effective amount to inhibit gelling of said liquid additive at $T_C$ and so as to provide a substantially homogeneous solution of additive in water;

dividing said solution into a first portion and a second portion;

mixing said first portion with a viscous hydrocarbon in a first dynamic mixer so as to provide a first hydrocarbon in water emulsion having a first average droplet size;

mixing said second portion with a viscous hydrocarbon in a second dynamic mixer so as to provide a second hydrocarbon in water emulsion having a second average droplet size; and mixing said first emulsion and said second emulsion so as to provide a final bimodal emulsion.

2. The process of claim 1, wherein said liquid additive comprises at least one surfactant selected from the group consisting of nonionic surfactants, anionic surfactant, natural surfactants, activating additives for activating inactive surfactants and combinations thereof.

3. The process of claim 2, wherein said liquid additive comprises an activating additive, and said activating additive is a pH buffer solution selected so as to provide said solution with a pH of at least about 10.

4. The process of claim 2, wherein said liquid additive comprises an activating additive, and said activating additive is an alkaline additive selected from the group consisting of sodium, potassium and lithium hydroxides and carbonates, amines and combinations thereof.

5. The process of claim 1, wherein said hydrocarbon is selected from the group consisting of crude oil, viscous hydrocarbon, refinery resid, natural bitumen and mixtures thereof, having an API gravity of at least about 5.

6. The process of claim 1, wherein said final bimodal emulsion has a hydrocarbon to water ratio greater than 60:40 v/v, with said first average droplet size being about 20 microns and said second average droplet size being about 3 microns.

7. The process of claim 1, wherein said bimodal emulsion has two distinct droplet size populations.

* * * * *